United States Patent
Williams et al.

(10) Patent No.: US 7,347,450 B2
(45) Date of Patent: Mar. 25, 2008

(54) AIRBAG CUSHION WITH CINCH TUBE FOR REDUCED OUT-OF-POSITION EFFECTS

(75) Inventors: Jeffrey D. Williams, Roy, UT (US); Larry D. Rose, South Weber, UT (US); Bradley W. Smith, Ogden, UT (US); Michael P. Jordan, South Weber, UT (US); Patrick D. Jamison, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 344 days.

(21) Appl. No.: 10/959,256

(22) Filed: Oct. 6, 2004

(65) Prior Publication Data
US 2006/0071461 A1   Apr. 6, 2006

(51) Int. Cl.
*B60R 21/16* (2006.01)
(52) U.S. Cl. .................... 280/739; 280/743.2
(58) Field of Classification Search ........... 280/739, 280/743.1, 743.2; *B60R 21/28*
See application file for complete search history.

(56) References Cited

U.S. PATENT DOCUMENTS

| | | | | |
|---|---|---|---|---|
| 5,280,953 A | | 1/1994 | Wolanin et al. | 280/739 |
| 5,405,166 A | * | 4/1995 | Rogerson | 280/739 |
| 6,095,557 A | | 8/2000 | Takimoto et al. | 280/739 |
| 6,126,196 A | * | 10/2000 | Zimmerman | 280/739 |
| 6,139,048 A | | 10/2000 | Braunschädel | 280/728.1 |
| 2003/0020266 A1 | * | 1/2003 | Vendely et al. | 280/739 |
| 2003/0020268 A1 | * | 1/2003 | Reiter et al. | 280/742 |
| 2003/0209895 A1 | * | 11/2003 | Gu | 280/739 |
| 2004/0012179 A1 | * | 1/2004 | Pinsenschaum et al. | 280/739 |
| 2004/0056459 A1 | * | 3/2004 | Kassman et al. | 280/739 |
| 2004/0090054 A1 | * | 5/2004 | Bossecker et al. | 280/739 |
| 2004/0130135 A1 | * | 7/2004 | Ekdahl | 280/739 |
| 2004/0188990 A1 | * | 9/2004 | Short et al. | 280/739 |
| 2006/0071462 A1 | * | 4/2006 | Smith et al. | 280/739 |

FOREIGN PATENT DOCUMENTS

JP              05085295           *    4/1993

OTHER PUBLICATIONS

Search Report and Written Opinion concerning the Corresponding International Application No. PCT/US05/27255.

* cited by examiner

*Primary Examiner*—Ruth Ilan
(74) *Attorney, Agent, or Firm*—Sally J Brown; Stoel Rives, LLP (57) ABSTRACT

An airbag cushion is disclosed for use in automotive protective systems. The airbag cushion includes a tube that may be restricted to prevent gas venting. A cord is coupled to the tube and to a surface of the cushion. Upon airbag deployment, the cord extends until taut or extends until the cushion encounters an obstruction. If pulled taut, the cord tightens the tube and restricts gas venting. If the cushion encounters an obstruction, the cord remains lax and the tube is able to vent gas.

20 Claims, 7 Drawing Sheets

AIRBAG CUSHION WITH CINCH TUBE FOR REDUCED OUT-OF-POSITION EFFECTS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, the airbag cushion inflates and deploys through a cosmetic cover. The airbag cushion deploys towards the occupant and provides a restraint. A dangerous situation occurs where an occupant is positioned to closely to the airbag which causes the occupant to contact the airbag as it is deploying. Ideally, the occupant should be in position to contact the airbag only after full deployment. It would be advantageous to provide an airbag with a softer deployment when an occupant is out-of-position. Embodiments described below provide an airbag cushion that responds to an occupant's position and vents accordingly to avoid excessive deploying impact.

Embodiments disclosed herein include a cinch cord that is connected at one end to a cinch tube and at an opposing end to an interior surface of the cushion. If an occupant is in close proximity to the deploying airbag and restricts normal inflation, the cinch tube remains open and allows gas to rapidly escape. If the occupant is in a normal position and inflation is unrestricted, the tension pulls on the cinch tube to quickly close the cinch tube. Closure retains gas for normal occupant restraint. Thus, the cinch tube may be used as a variable feature in out-of-position conditions and in normal restraint conditions. In this manner, the airbag cushion is sensitive to obstructive expansion of the cushion.

Figure 1A:
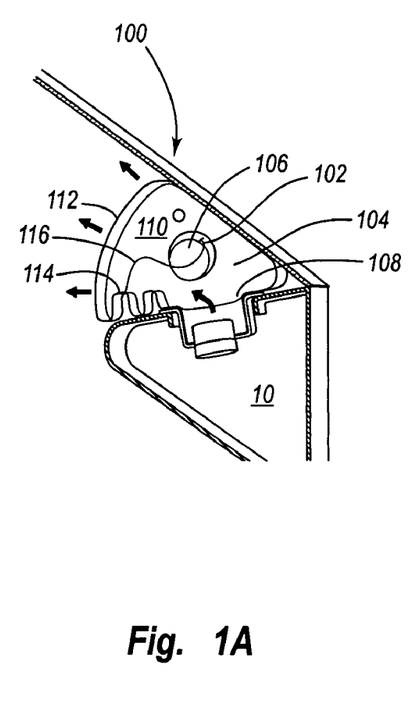
FIG. 1A is a cross-sectional view of an embodiment of a deploying airbag cushion.
Figure 1B:
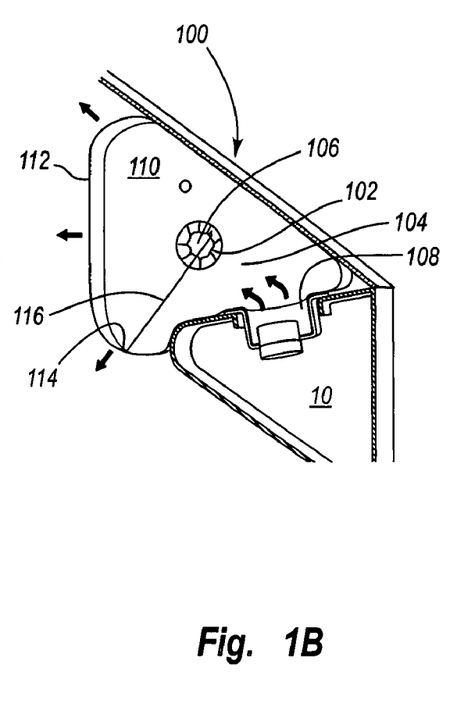
FIG. 1B is a cross-sectional view of the deploying airbag cushion of FIG. 1A.
Figure 1C:
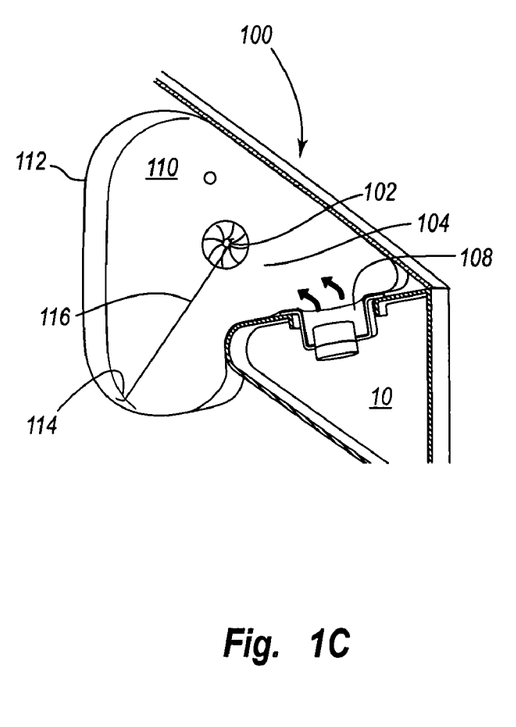
FIG. 1C is a cross-sectional view of an embodiment of a deploying airbag cushion of FIGS. 1A and 1B.

With reference now to the accompanying figures, particular embodiments of the invention will now be described in greater detail. FIGS. 1A through 1C depicts a cross-sectional view of an airbag cushion 100 deploying from a housing 10. The airbag cushion 100 includes a cinch tube 102 that may include a nylon woven fabric-type or other suitable material known in the art. The cinch tube 102 may be embodied with a generally cylindrical shape and having opposing open ends to enable gas venting. The cinch tube 102 may have any suitable shape such as rectangular, triangular, or polygon shapes. The cinch tube 102 may be embodied with a height that is sufficient to achieve desired closure.

The cinch tube 102 is coupled to a surface 104 of the airbag cushion 100 and circumvents an aperture 106 in the surface 104. The surface 104 may form part of an airbag cushion throat 108 or may be proximate to the throat 108. The cinch tube 102 may extend into the airbag cushion interior 110 or may extend from the airbag cushion 100. For illustrative purposes, a single cinch tube 102 is disclosed but the airbag cushion 100 may include multiple cinch tubes to provide required venting capability.

The airbag cushion 100 includes a cinch cord 112 that couples or engages the cinch tube 102 and couples to a surface 114 of the airbag cushion 100. The cinch cord 112 may include a nylon material or other suitable material known in the art. The surface 114 may be an interior surface of the airbag cushion as depicted. The surface 114 may be the surface opposing the face surface 116 of the airbag cushion that contacts the occupant. Alternatively, the surface 114 may be disposed proximate to a surface opposing the face surface 116. The surface 114 may be an exterior surface such as the face surface 116. Thus, the cinch cord 112 may extend through the interior 110 of the airbag cushion 100 or may be positioned exterior to the airbag cushion 100. The location of the surface 114 depends on module deployment angle, vehicle interior geometry, and cushion fold type.

In FIG. 1A, the initially deploying airbag cushion 100 has a slack cinch cord 112 and the cinch tube 102 remains open. In FIG. 1B, the cinch cord 112 is pulled taut and the cinch tube 102 begins to close. In FIG. 1C, the cinch cord 112 is completely taut and the cinch tube 102 is closed.

Figure 2A:
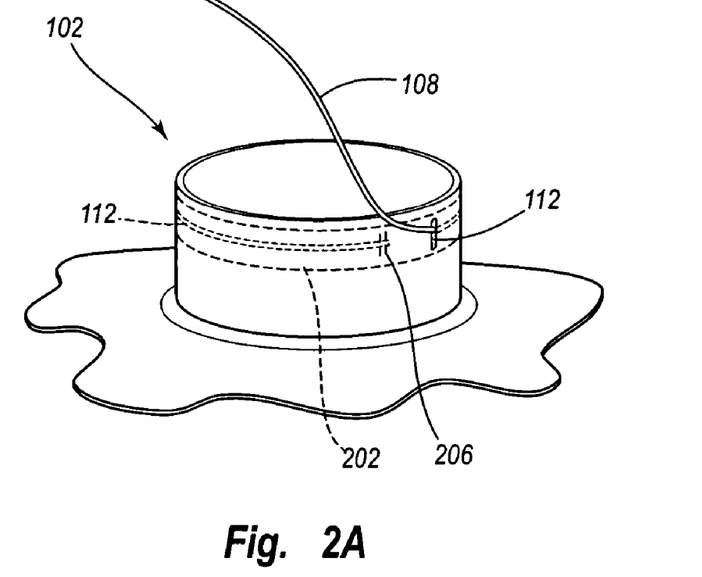
FIG. 2A is a perspective view of an embodiment of a cinch tube.
Figure 2B:
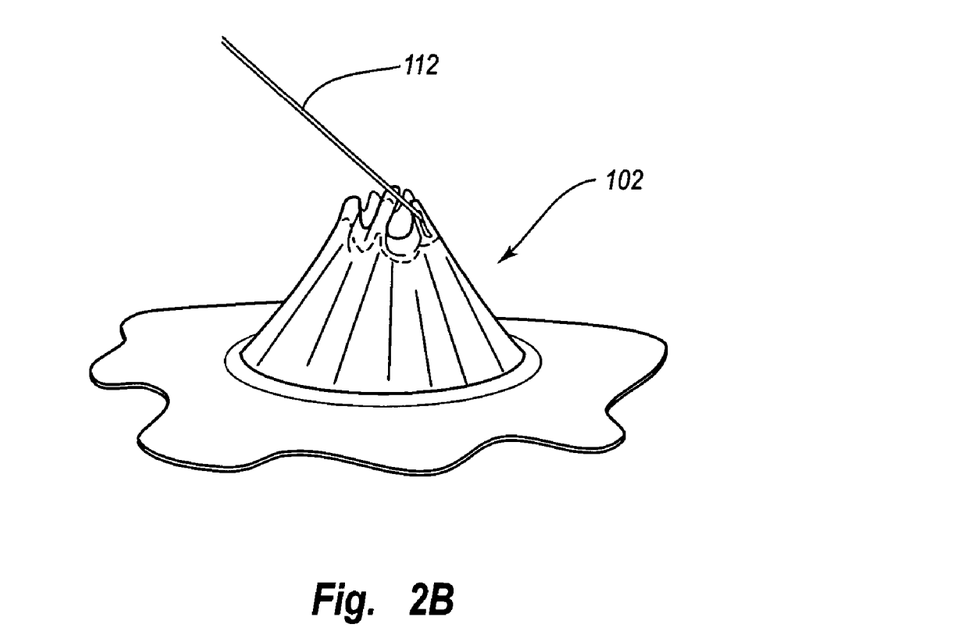
FIG. 2B is a perspective view of the cinch tube of FIG. 2A.

Referring to FIGS. 2A and 2B, perspective views of one embodiment of a cinch tube 102 in both the open and closed positions are shown. The cinch cord 112 circumvents a majority of the perimeter 200 of the cinch tube 102 in order to properly tighten and restrict the cinch tube 102. The cinch cord 112 has a length that includes an initial free length and a circumference of the cinch tube 102. The cinch cord 112 may be disposed within a sleeve 202 that is formed within the cinch tube 102. Access to the sleeve 120 is through a sleeve aperture 204 formed in the cinch tube 102. The cinch cord 112 enters the sleeve aperture 204, feeds through the sleeve 202, and is coupled at an end 206 within the sleeve 120 to the cinch tube 102. Coupling may be achieved by stitches, bonds, or adhesives.

Figure 3:
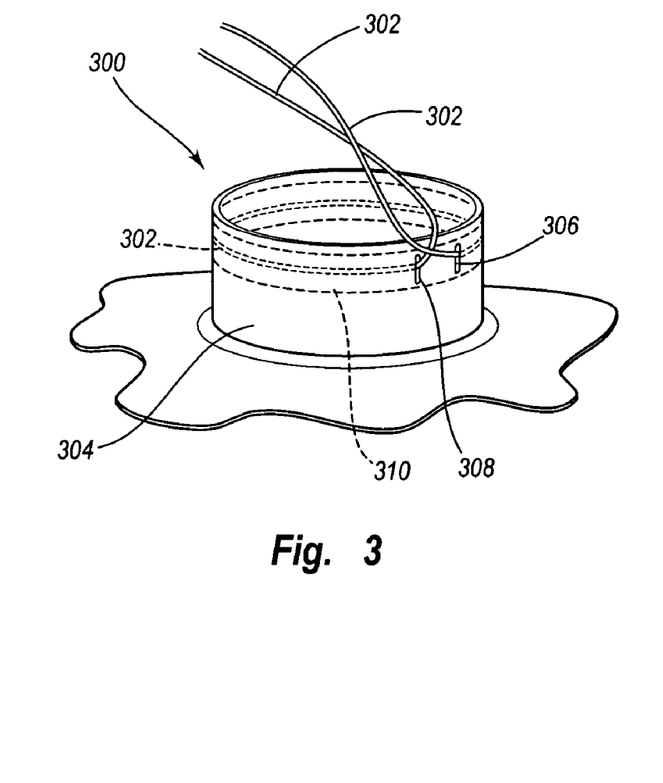
FIG. 3 is a perspective view of an alternative embodiment of a cinch tube.

Referring to FIG. 3 an alternative embodiment of a cinch tube 300 is shown wherein a cinch cord 302 loops around the majority of the cinch tube perimeter 304. The cinch tube 300 includes first and second sleeve apertures 306, 308 that are in communication with a sleeve 310 formed within the cinch tube 300. The cinch cord 302 enters the first sleeve aperture 306, extends along the sleeve 310, and exits out the second sleeve aperture 308.

Figure 4:
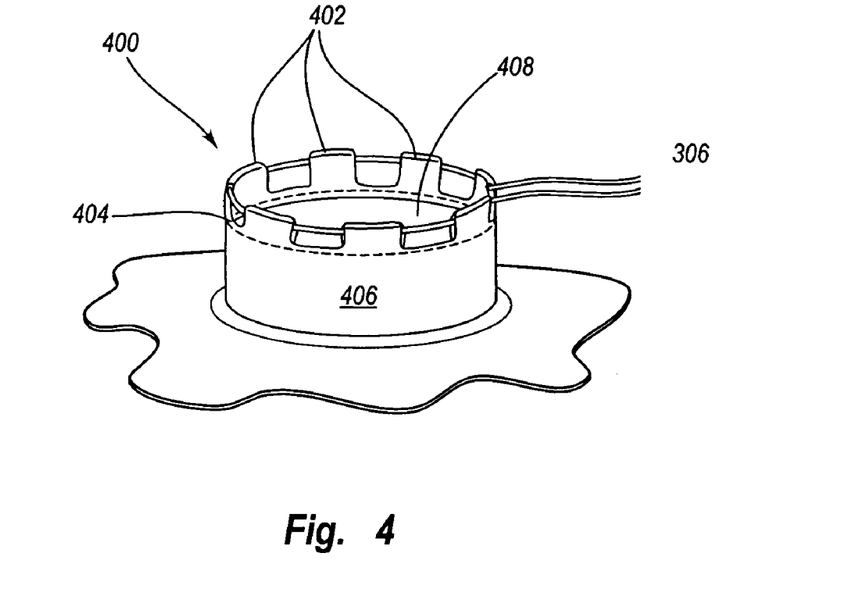
FIG. 4 is a perspective view of another alternative embodiment of a cinch tube.

Referring to FIG. 4, an alternative embodiment of a cinch tube 400 is shown wherein the cinch tube 400 includes a plurality of cinch loops 402. The cinch loops 402 may be disposed on a periphery 404 as shown or on an inner or outer surface 406, 408 of the cinch tube 400. A cinch cord 410 is fed through the cinch loops 402 and is thereby able to restrict the cinch tube 400 as needed.

Figure 5A:
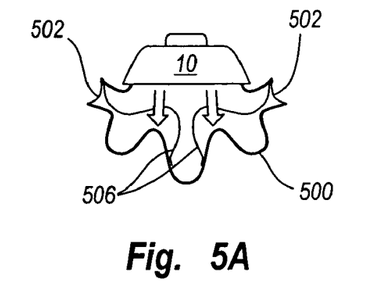
FIG. 5A is a cross-sectional view illustrating initial deployment of an airbag cushion.
Figure 5B:
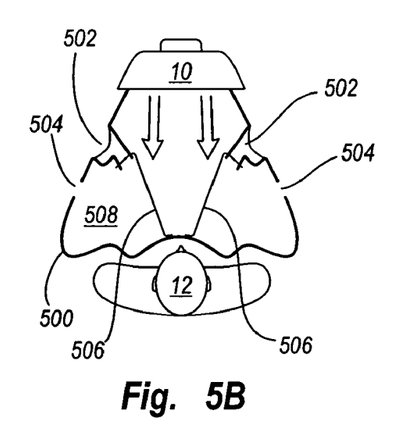
FIG. 5B is a cross-sectional view illustrating a deploying airbag cushion.
Figure 5C:
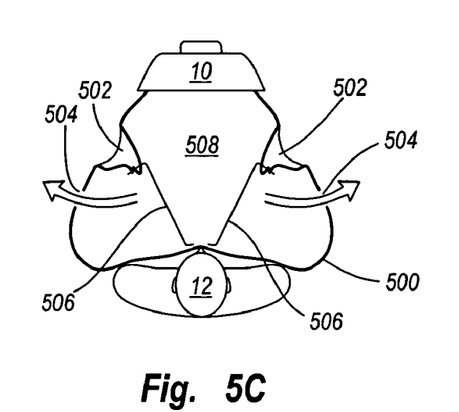
FIG. 5C is a cross-sectional view of a deployed airbag cushion.

FIGS. 5A-C illustrate three stages of a deploying airbag cushion 500 without obstruction in the deploying path. The depicted airbag cushion 500 includes two cinch tubes 502 symmetrically disposed on the cushion 500 and two vents 504 symmetrically disposed on the cushion 500. The vents 504 provide consistent venting of the airbag cushion 500 and are not restricted by an occupant's position. The vents 504 may be optional in certain cushion embodiments based on venting requirements. The locations for the cinch tubes 502 and vents 504 may vary as does the number of tubes 502 and vents 504. An occupant 12 is in a normal seating position which will allow the airbag cushion 500 to fully expand before impacting the occupant. In this manner, the occupant 12 benefits from the full restraint capability of the airbag cushion 500.

In FIG. 5A, the initial breakout of the airbag cushion 500 occurs. The cinch tubes 502 are open and, in the depicted embodiment, extend from the airbag cushion 500. In FIG. 5B, cinch cords 506 corresponding to each cinch tube 502 are pulled taut and the cinch tubes 502 are restricted. The cinch tubes 502 may also be pulled within the interior 508 of the airbag cushion 500. In FIG. 5C, the cinch tubes 502 are completely closed, the gas vents through the vents 504, and normal restraint is provided to the occupant 12.

Figure 5D:
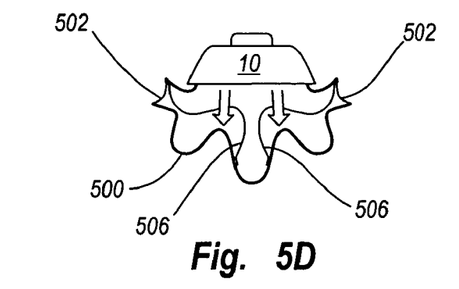
FIG. 5D is a cross-sectional view illustrating initial deployment of an airbag cushion.
Figure 5E:
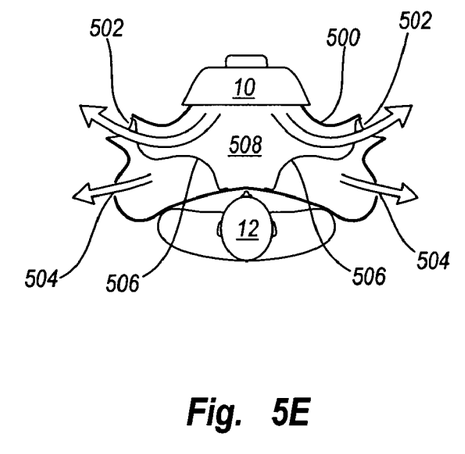
FIG. 5E is a cross-sectional view illustrating a deploying airbag cushion.
Figure 5F:
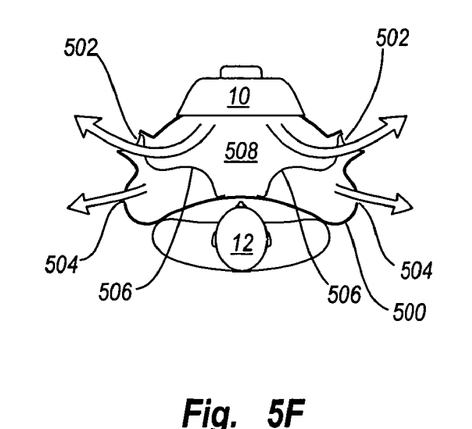
FIG. 5F is a cross-sectional view of a deployed airbag cushion.

FIGS. 5D-F illustrate three stages of a deploying airbag cushion 500 with obstruction in the deploying path. An occupant 12 is out-of-position and obstructs the deploying airbag cushion 500 and prevents the airbag cushion 500 from fully inflating. In FIG. 5D, the airbag cushion 500 begins initial deployment as in FIG. 5A. In FIG. 5E, the airbag cushion 500 impacts the occupant 12 and the cinch cords 506 remain slack. The cinch tubes 502 remain open and venting rapidly occurs from tubes 502 and vents 504. The cushion inflation is restricted but the occupant 12 receives less than the full deployment loading of the cushion 500. In FIG. 5F, the cushion 500 is partially inflated and provides limited restraint. Venting continues through the tubes 502 and vents 504.

Figure 6:
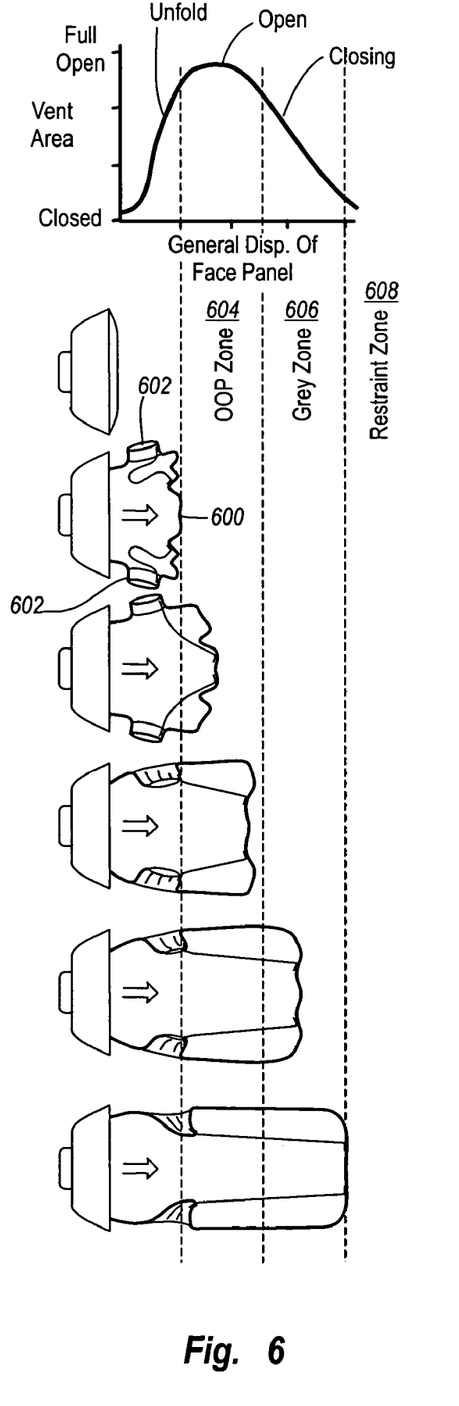
FIG. 6 is a diagram illustrating an airbag cushion venting graph in relation to an airbag cushion's deployment.

Referring to FIG. 6 a graph illustrating cinch tube venting as a function of airbag cushion displacement is shown. For reference, an airbag cushion 600 is shown in various stages of deployment. The airbag cushion 600 includes two symmetrically disposed cinch tubes 602. During initial deployment, the airbag cushion 600 is unfolding and the cinch tubes 602 provide little or no venting. The airbag cushion 600 expands into an out-of-position zone 604 where, if obstructed, the cinch tubes 602 will remain completely or nearly open and full venting occurs. In this zone an occupant does not receive the full restraint capability but does benefit from limited restraint. If unobstructed, the airbag cushion 600 expands into a gray zone 606 where partial closure of the cinch tubes 602 begins and venting is limited. The cinch tubes 602 may be pulled into the airbag cushion 600 depending on the cushion design. If further unobstructed, the airbag cushion 600 fully expands to the restraint zone 608. At this zone, the cinch tubes 602 completely close and an occupant benefits from the full restraint capability of the airbag cushion 600.

Figure 7:
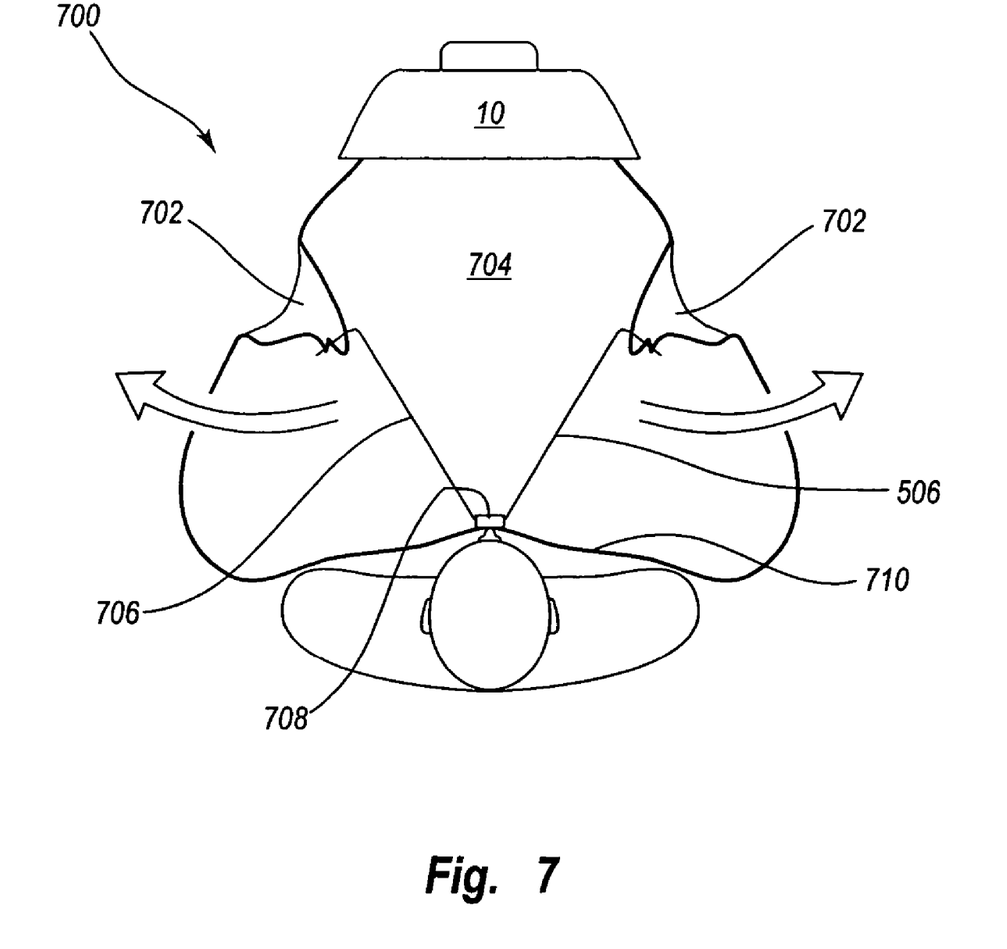
FIG. 7 is a cross-sectional view of an alternative embodiment of a deployed airbag cushion.

Referring to FIG. 7, an alternative embodiment of an airbag cushion 700 is shown. The airbag cushion 700 includes two symmetrical cinch tubes 702 that may be embodied as described above. The cinch tubes 702 have been pulled completely into the airbag cushion interior 704. Rather than having cinch cords corresponding to each cinch tube 702, a single cinch cord 706 is used. The cinch cord 706 is coupled to or engages each cinch tube 702 in a manner similar to that previously described. The cinch cord 706 passes through a cord loop 708 that is coupled to an interior surface 710. The cord loop 708 may be formed of a fabric material similar or identical to that of the airbag cushion 700. The cinch cord 706 may freely pass through the loop 708 and may therefore be referred to as a "floating" cinch cord. In an alternative embodiment, the cinch cord 706 may be disposed on the airbag cushion exterior and passes through a cord loop 708 coupled to an exterior surface of the airbag cushion 700. In either embodiment, airbag cushion deployment pulls the cinch cord 706 taut and closes both cinch tubes 702.

Figure 8:
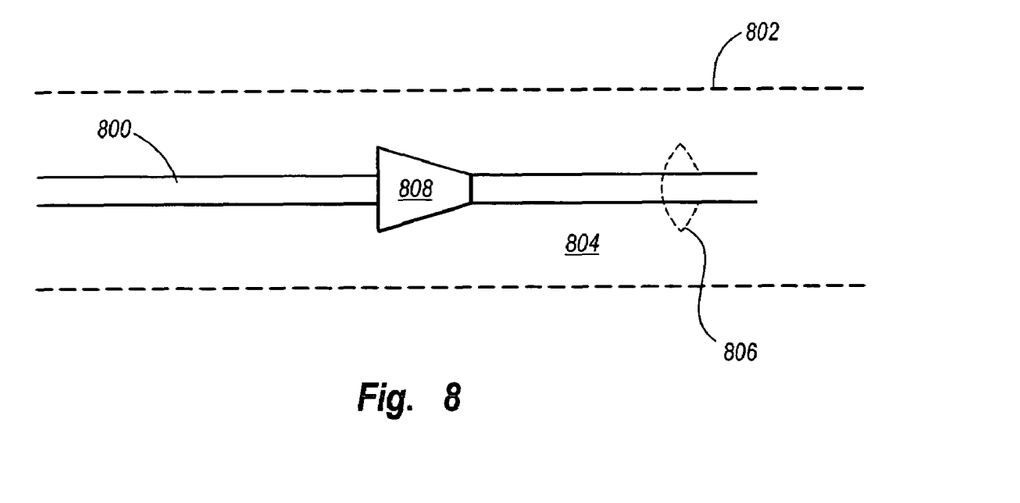
FIG. 8 is a side view of one embodiment of a cinch cord disposed within a cinch tube.

Referring to FIG. 8, an alternative embodiment of a cinch cord 800 disposed within a cinch tube 802 is shown. The cinch tube 802 includes a sleeve 804 that extends around a periphery of the cinch tube 802 and houses a portion of the cinch cord 800. The cinch cord 800 exits from the sleeve 804 through a sleeve aperture 806. The cinch cord 800 includes a stopper 808 that, prior to airbag cushion deployment, is disposed within the sleeve 804. The stopper 808 is sized and configured to permit deploying movement, i.e. from the sleeve 804 and through the aperture 806, but does restricts movement through the aperture 806. In operation, the stopper 808 prevents a cinch tube 802 from reopening after deployment and closure of the cinch tube 802. This may occur during deflation of an airbag cushion as the cinch cord becomes slack. Venting is thereby directed to other vents.

Figure 9:
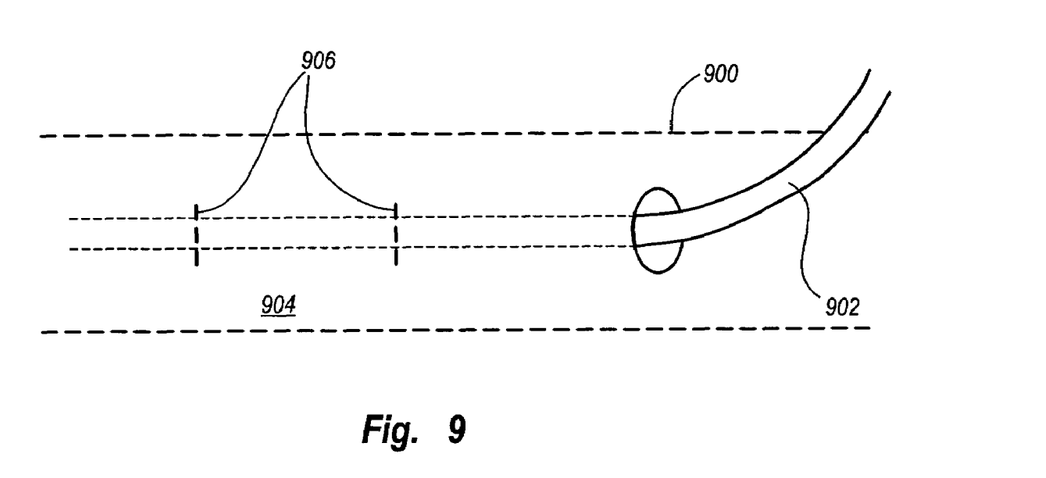
FIG. 9 is a side view of another embodiment of a cinch tube with a cinch cord partially disposed therein.

Referring to FIG. 9, an alternative embodiment of a cinch tube 900 is shown with a cinch cord 902 partially disposed within. The cinch tube 900 includes a sleeve 904 that contains a portion of the cinch cord 902. The cinch tube 900 further includes tack stitching 906 that is inserted through the sleeve 904 and the cinch cord 902 to retain the cinch cord 902 and prevent inadvertent closing of the cinch tube 900 during shipping and handling. The tack stitching 906 is designed to be easily broken and provides no interference to airbag cushion deployment.

Embodiments disclosed herein illustrate novel techniques for venting an airbag cushion to retain an open vent when an occupant obstructs the path of a deploying cushion and closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for cinch tubes have been disclosed herein. Venting means refers to cinch tubes 102, 300, 400, 502, 602, 702, 802, and 900. Restricting means refers to cinch cords 112, 302, 410, 506, 706, 800, and 902, It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag cushion module, comprising:
   an inflatable airbag cushion defining an interior;
   a cinch tube having a base end opposite from a terminal end, wherein the terminal end has an aperture; and
   a cinch cord coupled to the terminal end of the cinch tube and extending around a majority of the aperture of the terminal end of the cinch tube, the cinch cord further coupled to a surface of the airbag cushion such that upon inflatable airbag deployment with obstruction, the cinch cord does not fully extend and the cinch tube remains open, and upon inflatable airbag deployment without obstruction, the cinch cord extends and at least partially closes the aperture at the terminal end,
   wherein the cinch tube is configured such that the aperture at the terminal end at least partially closes, upon inflatable airbag deployment without obstruction, without necessitating closure of the base end of the cinch tube, and
   wherein the configuration of the cinch tube and the length of the cinch cord enables the aperture to at least partially close, upon inflatable airbag deployment without obstruction, such that the terminal end is at least partially within the interior of the inflatable airbag cushion after the aperture becomes at least partially closed.

2. The airbag cushion module of claim 1, wherein the cinch tube includes,
   a sleeve extending around the majority of the aperture of the terminal end of the cinch tube and housing a portion of the cinch cord; and
   a sleeve aperture in communication with the sleeve and through which the cinch cord passes.

3. The airbag cushion module of claim 2, further comprising a stopper coupled to the cinch cord and disposed within the sleeve prior to airbag deployment, the stopper adapted to pass through the sleeve aperture upon airbag deployment and resisting entry into the sleeve aperture after airbag deployment.

4. The airbag cushion module of claim 2, further comprising a tack stitch inserted into the sleeve and the cinch cord.

5. The airbag cushion module of claim 2, wherein the cinch tube includes a plurality of loops and wherein the cinch cord is disposed within the loops.

6. The airbag cushion module of claim 1, wherein the surface coupled to the cinch cord is an internal surface of the inflatable airbag cushion and the cinch cord is disposed within the interior of the inflatable airbag cushion.

7. The airbag cushion module of claim 1, wherein the surface coupled to the cinch cord is an external surface of the inflatable airbag cushion.

8. The airbag cushion module of claim 1, further comprising:
   a second cinch tube having a base end opposite from a terminal end, wherein the terminal end has an aperture; and
   a second cinch cord coupled to the terminal end of the second cinch tube and extending around a majority of the aperture of the terminal end of the second cinch tube, the second cinch cord further coupled to a surface of the airbag cushion such that upon inflatable airbag deployment with obstruction, the second cinch cord does not fully extend and the second cinch tube remains open, and
   upon inflatable airbag deployment without obstruction, the second cinch cord extends and at least partially closes the aperture at the terminal end without necessitating closure of the base end of the second cinch tube;
   wherein the second cinch tube is configured such that the aperture at the terminal end of the second cinch tube at least partially closes, upon inflatable airbag deployment without obstruction, without necessitating closure of the base end of the second cinch tube, and
   wherein the configuration of the second cinch tube and the length of the second cinch cord enables the aperture to at least partially close, upon inflatable airbag deployment without obstruction, such that the terminal end of the second cinch tube is at least partially within the interior of the inflatable airbag cushion after the aperture of the second cinch tube becomes at least partially closed.

9. The airbag cushion module of claim 8, wherein the cinch tubes are symmetrically disposed on the airbag cushion.

10. The airbag cushion module of claim 1, further comprising a vent disposed on the airbag cushion and adapted to vent gas during airbag deployment with and without obstruction.

11. An airbag cushion module, comprising:
    an inflatable airbag cushion defining an interior;
    a first cinch tube and a second cinch tube, wherein each cinch tube has a base end opposite from a terminal end, and each terminal end has an aperture; and
    a cinch cord coupled to the first and second cinch tubes and extending around a majority of the aperture of the terminal end of each of the cinch tubes;
    wherein the cinch cord passes through a cinch loop coupled to a surface of the airbag cushion at a location such that upon inflatable airbag deployment with obstruction, the cinch cord does not fully extend and the cinch tubes remain open, and
    upon inflatable airbag deployment without obstruction, the cinch cord extends and at least partially closes the apertures of the terminal ends of the cinch tubes;
    wherein the cinch tubes are configured such that the apertures at the terminal ends at least partially closes, upon inflatable airbag deployment without obstruction, without necessitating closure of the base ends of the cinch tubes, and
    wherein the configuration of the cinch tubes and the length of the cinch cord enables the apertures to at least partially close, upon inflatable airbag deployment without obstruction, such that the terminal ends are at least partially within the interior of the inflatable airbag cushion after the apertures becomes at least partially closed.

12. The airbag cushion module of claim 11, wherein the first and second cinch tubes each include,
   a sleeve extending around the majority of the aperture of the terminal end of the cinch tube and housing a portion of the cinch cord; and
   a sleeve aperture in communication with the sleeve and through which the cinch cord passes.

13. The airbag cushion module of claim 12, further comprising a first stopper coupled to the cinch cord and disposed within the sleeve of the first cinch tube and a second stopper coupled to the cinch cord and disposed within the sleeve of the second cinch tube, the first and second stoppers adapted to pass through corresponding sleeve apertures upon airbag deployment and resisting entry into the sleeve apertures after airbag deployment.

14. The airbag cushion module of claim 12, further comprising tack stitches inserted into the sleeves of the first and second cinch tubes and the cinch cord.

15. The airbag cushion module of claim 11, wherein the first and second cinch tubes each include a plurality of loops and wherein the cinch cord is disposed within the loops.

16. The airbag cushion module of claim 11, wherein the surface coupled to the cinch loop is an interior surface of the inflatable airbag cushion and the cinch cord is disposed within the interior of the inflatable airbag cushion.

17. The airbag cushion module of claim 11, wherein the surface coupled to the cinch cord is an external surface of the inflatable airbag cushion.

18. The airbag cushion module of claim 11, wherein the first and second cinch tubes are symmetrically disposed on the inflatable airbag cushion.

19. The airbag cushion module of claim 11, further comprising a vent disposed on the inflatable airbag cushion and adapted to vent gas during airbag deployment with and without obstruction.

20. An airbag cushion module, comprising:
   an inflatable airbag cushion defining an interior;
   means for venting gas out of the airbag; and
   means for restricting gas venting by cinching the venting means to reduce the circumference of the venting means at a terminal end without necessitating closure of an opposing base end upon inflatable airbag deployment without obstruction and enabling the venting means to remain open upon inflatable airbag deployment with obstruction
   wherein the configuration of the venting means and configuration of the means for restricting gas venting enable the venting means to at least partially close, upon inflatable airbag deployment without obstruction, such that the terminal end is at least partially within the interior of the inflatable airbag cushion after the venting means becomes at least partially closed.

* * * * *